United States Patent [19]

Montville et al.

[11] Patent Number: 5,196,221
[45] Date of Patent: Mar. 23, 1993

[54] PROCESS FOR INHIBITING THE GROWTH OF BACTERIA ON SEAFOOD

[75] Inventors: Thomas J. Montville, North Brunswick; Donna M. Curran, East Brunswick, both of N.J.

[73] Assignee: Rutgers University, New Brunswick, N.J.

[21] Appl. No.: 477,328

[22] Filed: Feb. 8, 1990

[51] Int. Cl.$^5$ ............................................. A23B 4/027
[52] U.S. Cl. ..................................... 426/332; 426/643
[58] Field of Search ............................. 426/643, 332

[56] References Cited

U.S. PATENT DOCUMENTS

| 2,488,184 | 11/1949 | Garnatz . | |
| 4,060,642 | 11/1977 | Suzuki | 426/643 |
| 4,303,685 | 12/1981 | Katoh | 426/332 |
| 4,342,790 | 8/1982 | Katoh | 426/332 |
| 4,416,909 | 11/1983 | Aversano | 426/332 |
| 5,028,444 | 7/1991 | Yamamoto | 426/332 |

FOREIGN PATENT DOCUMENTS

| 55-102350 | 1/1979 | Japan . | |
| 55-102349 | 8/1980 | Japan | 426/643 |
| 60-47662 | 3/1985 | Japan | 426/643 |
| 60-476662 | 3/1985 | Japan . | |
| 61-67440 | 4/1986 | Japan | 426/332 |
| 61-55938 | 11/1986 | Japan | 426/643 |
| 62-130667 | 6/1987 | Japan | 426/643 |
| 63-309157 | 12/1988 | Japan | 426/643 |
| 1378805 | 3/1988 | U.S.S.R. | 426/643 |

OTHER PUBLICATIONS

Windholz 1976 The Merck Index 9th edition p. 8330.
Curran 1990 J. Food Science 55(6) 1564.
Grant 1969 Hackhi Chemical Dictionary 4th edition McGraw-Hill Book Company New York p. 96.
Kassensarm, B., et al., J. Food Sci. 28:28–37 (1963), "Nucleotide Degradation in the Muscle of Iced Haddock, Lemon Sole and Plaice".
Shewan, J. M., Handling, "Processing and Marketing of Tropical Fish", pp. 51–66 (1977).
Chai, T. et al., Appl. Microbiol. 16:1738–1741 (1968), "Detection and Incidence of Specific Species of Spoilage Bacteria on Fish".
Ogden, I. D., J. Appl. Bacteriol. 61:263–268 (1986), "Use of Conductance Methods to Predict Bacteriol Counts in Fish".
Fey, M. S. et al., J. Food Sci. 47:1048–1054 (1982), "Extending Shelf-Life of Fresh Wet Red Hake and Salmon Using CO2-O2 Modified Atmosphere and Potassium Sorbate . . .".
Chung, Y. et al., J. Food Protect, 44:66 (1981), "Inhibition of Microbial Growth in English Sole (Parophrys retulus)".
Statham, J. A. et al., J. Food. Sci. 50:1580 (1985), "Storage of Morwong (Nemadactylus macropterus) in Combinations of Polyphosphate, Potassium Sorbate and Carbon . . .".
Miller, S. A. et al., J. Food Sci., 49:188 (1984), "Effectiveness of Chlortetracycline In Combination With Potassium Sorbate Or Tetrasodium Ethylene-Diaminetetraacetate . . .".
Woyewoda, A. D., et al., Can. Inst. Food Sci. Technol. J., 17(1):24 (1984), "Controlled and Modified Atmosphere Storage of Cod Fillets".
Stenstrom, I., J. Food Protect. 48:585 (1985), "Microbial Flora of Cod Fillets Stored 2° C. In Different Mixtures of Carbon Dioxide and Nitrogen/Oxygen".
Corral, L. G. et al., J. Food Sci. 53:981–982 (1988), "Antimicrobial Activity of Sodium Bicarbonate".
Montville, T. J. et al., Appl. Environ. Microbiol. 53:2303–2307 (1987), "Sodium Bicarbonate Reduces Viability of Aspergillus Parasiticus in Czapek's Agar . . .".

(List continued on next page.)

Primary Examiner—Carolyn Paden
Attorney, Agent, or Firm—Bryan Cave

[57] ABSTRACT

Treatment with solutions of alkali metal bicarbonates extends the shelf life of seafood by inhibiting the growth of bacteria that cause spoilage and odors, and improve the texture and moisture retention of the seafood.

15 Claims, 7 Drawing Sheets

OTHER PUBLICATIONS

Curran, D. N. et al., Intl. J. Food Microbiol. 8:1-9 (1989) "Bicarbonate Inhibition of Saccharomyces Cerevisiae and Hansenula Wingie Growth . . . ".

Annual Meeting of the Institute of Food Technologists, Jun. 25, 1989, abstracts pp. 252-253 "Use of Bicarbonate for Microbial Control and Texture Improvement in Cod Fillets".

Levin, R. E., Appl. Microbiol. 16:1734-1737 (1968), "Detention and Incidence of Specific Spoilage Species of Spoilage Bacteria on Fish".

Krivchenia, M. et al., J. Food Sci. 53:999-1003 (1988), "Effect of Cryoprotectants on Frozen Whitefish Fillets".

Mizushima, S. et al., J. Bacteriol. 86:1295-1300 (1963), "Quantitative Studies on Glycolytic Enzymes in Lactobacillus Plantarum".

Hultin, H. O. "Characteristics of Muscle Tissue in Food Chemistry, (1985) (Marcel Dekker Inc., pub.)".

Hebbar, K. R. et al., Mysore J. Agric. Sci. (1981) 15(1), 97-107.

PROCESS FOR INHIBITING THE GROWTH OF BACTERIA ON SEAFOOD

This invention relates to a process for inhibiting the spoilage of fresh seafood, including fish and crustaceans. More particularly, this invention relates to a process and composition that prolongs both the lifetime and quality or texture of fresh seafood.

BACKGROUND OF THE INVENTION

Seafood is an excellent food that is increasingly popular because of its low fat and low cholesterol content and other health benefits. Unfortunately, it is also subject to rapid spoilage and is not safe to eat if not eaten within a short time of harvesting, i.e., within a couple of days, or treated to high energy processes such as canning or freezing which generally change the texture and flavor of the seafood markedly.

Seafood spoilage is mainly due to the rapid growth of bacteria in fresh seafood, particularly bacteria such as the psychotropic type, including Pseudomonas and Achromobacter. These bacteria grow rapidly, e.g. to a level of $10^6$, within a few days. They also produce hydrogen sulfide, which adds a noxious odor to the seafood.

Thus various researchers have attempted to find ways of preserving fresh seafood to prolong its shelf life to up to a week or more without causing a deterioration in the texture or flavor, and while maintaining safe levels of bacteria Chemical techniques for preserving seafood have been studied. For example, dipping fish in potassium sorbate successfully inhibited the growth of bacteria in English sole.

At a 1% concentration, microbial growth was inhibited for up to six days. However, this method is concentration dependent; little inhibition was noted at 0.1% sorbate concentration, and little or no inhibition was noted for this treatment for other species of fish such as red hake and salmon.

Chemical preservation combined with packaging under a modified atmosphere has met with some success in decreasing the bacterial spoilage of fresh seafood In one study, Australian morwong fish exhibited extended shelf life when dipped in 1.2% of potassium sorbate and 10% polyphosphate, followed by packaging in 100% of carbon dioxide. However, maintaining fish in an atmosphere other than air greatly increases the cost of the product. Rock fish fillets dipped in 1% potassium sorbate and 5 ppm of chlorotetracycline, followed by vacuum packaging and storage at 2° C., greatly extended their shelf life up to 14 days. However, again this method is expensive and burdensome for both fish suppliers and handlers.

Thus a method of extending the shelf life of fresh seafood by inhibiting the growth of odor and spoilage-causing bacteria and improving the texture of the seafood in a non-energy intensive manner, has long been sought.

SUMMARY OF THE INVENTION

We have found that by dipping seafood including fresh fish and crustaceans in a solution containing one or more alkali metal bicarbonates, the growth of odor and spoilage-causing bacteria is substantially inhibited for up to 8 days. An additional advantage of the invention is that this treatment also improves the texture and moisture retention of the seafood.

DETAILED DESCRIPTION OF THE INVENTION

In accordance with the process of the invention, fresh seafood is treated with a bicarbonate solution which inhibits the formation of spoilage-causing bacteria, including both bacteria which produce hydrogen sulfide and proteolytic organisms, greatly increasing the shelf life of fresh seafood, and also improving the moisture retention of the seafood, which enhances its flavor and texture.

The seafood is immersed in an aqueous solution containing one or more alkali metal bicarbonates, in a concentration of from about 3% by weight up to saturation, for periods up to about 8 hours.

Suitable bicarbonates include ammonium bicarbonate, sodium bicarbonate and potassium bicarbonate. A saturated solution of ammonium bicarbonate contains about 12% by weight of bicarbonate; a saturated solution of sodium bicarbonate contains about 8% by weight of bicarbonate, and a saturated solution of potassium bicarbonate contains about 26% by weight of bicarbonate. Since in certain instances, ammonium bicarbonate by itself, while very effective in inhibiting the growth of bacteria, produces an ammonia odor in seafood, particularly in crustaceans such as shrimp, it is preferred that the seafood be immersed in a solution containing mixtures of ammonium and sodium bicarbonates. The higher the concentration of sodium bicarbonate in the solution, the less the odor of ammonia is imparted to the seafood. In particular, aqueous saturated solutions containing proportions of ammonium bicarbonate to sodium bicarbonate of from 1:1 to about 1:15, are preferred, since they both reduce microbial growth and greatly reduce or eliminate the odor of ammonia from treated seafood.

Although the reason for the quality improvement, e.g. texture and moisture retention, in seafood treated in accordance with the invention is not known with certainty, it is believed the pH of the seafood, which is increased by about 1-1.5 pH units after treatment with a bicarbonate solution, reduces the moisture loss from the seafood, resulting in flakier, more tender seafood than untreated controls, as will be demonstrated hereinafter.

The invention will be further described by means of the following examples, but the invention is not meant to be limited to the details disclosed therein.

The analysis for total bacterial growth was made by blending 50 grams of the seafood with 450 ml of cold 0.1% peptone water for 2 minutes. Total bacterial growth was determined by standard plate counts using Plate Count Agar (PCA) and an incubation period of 4 days at 20° C.

The analysis for hydrogen sulfide (hereinafter $H_2S$) producing bacteria, indicators of odor-producing organisms, were enumerated on $H_2S$ media which consisted of beef extract, 3 g/l, yeast extract, 3 g/l, peptone, 5 g/l, tryptone, 15 g/l, ferric citrate, 0.3 g/l, cysteine hydrochloride, 0.4 g/l, sodium chloride, 5 g/l, sodium thiosulphate .5 $H_2O$, 0.5 g/l and agar, 15 g/l. $H_2S$-producing bacteria, which appear as dense black colonies, were counted after incubating for 4 days at 20° C.

The analysis for proteolytic bacteria, which cause structural deterioration of seafood, were counted on media containing $MnSO_4$, 0.5 g/l, sodium chloride, 5 g/l, Nutrient Broth (Difco) 8 g/l, and agar, 15 g/l. 0.1 ml of each dilution was applied to the surface of duplicate plates and spread with a glass rod. A soft agar-gelatin overlay was applied and the plates were incubated for 3 days at 20° C. To precipitate any remaining gelatin, 10 ml of a 5% acetic acid solution was applied to the surface of the plates. After 15 minutes, colonies with clear zones were counted.

EXAMPLES 1-3

The effect of bicarbonate treatments on bacterial growth in cod fillets was examined by dipping locally obtained fresh cod fillets in several solutions, including saturated sodium bicarbon (8%), saturated ammonium bicarbonate (12%), a distilled water control, and a second control of distilled water adjusted to the pH of saturated sodium bicarbonate (pH 7.9) with 6N sodium hydroxide, each for one-half hour. The cod fillets were then stored at 4° C. Microbial analyses were measured on days 0, 1, 2, 3, 4, 6, and 8.

Figure 1:
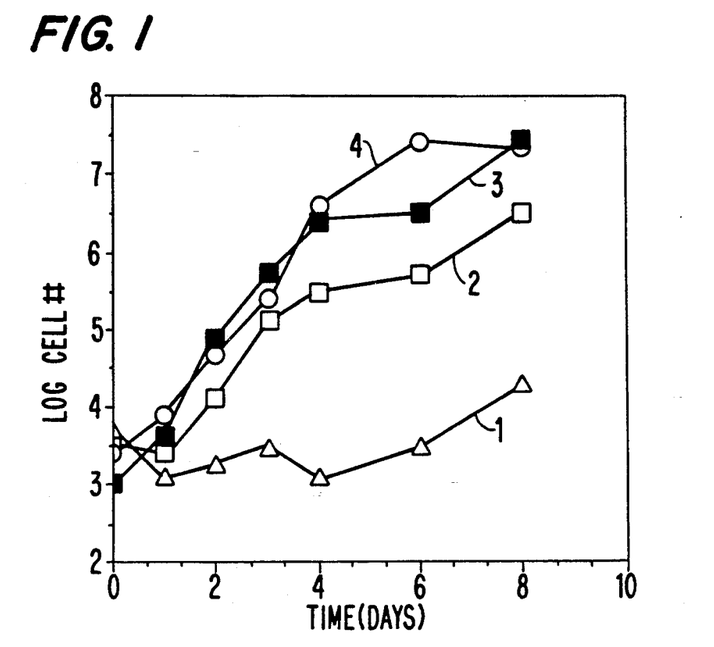
FIG. 1 is a graph showing the total aerobic bacterial growth versus time for variously treated fresh cod fillets.
Figure 2:
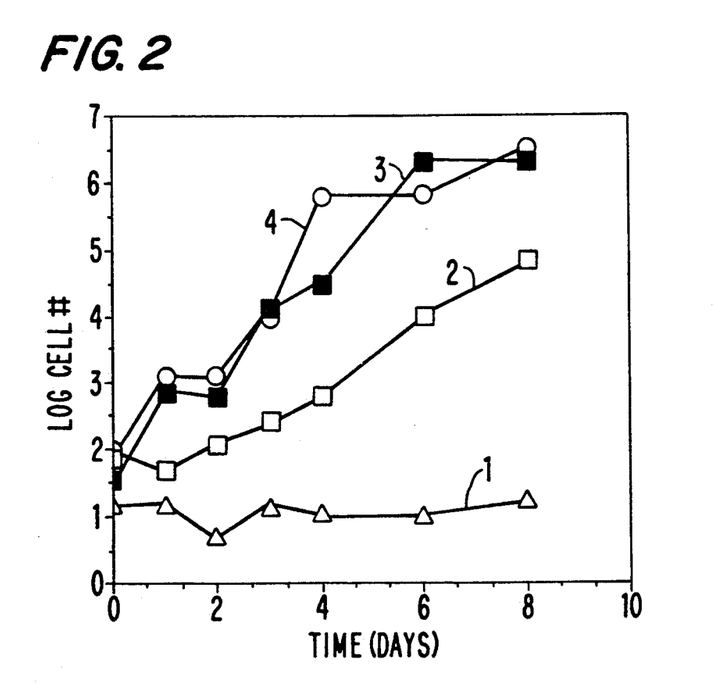
FIG. 2 is a graph showing the growth of hydrogen sulfide-producing bacteria versus time for variously treated fresh cod fillets.
Figure 3:
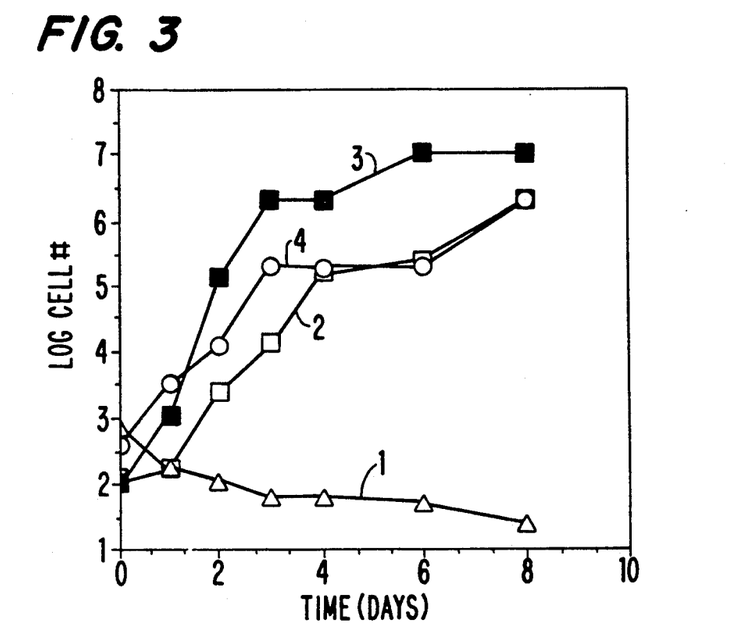
FIG. 3 is a graph showing the growth of proteolytic bacteria on variously treated fresh cod fillets.

The data are summarized in FIGS. 1-3, wherein the graphs show the variation of the log of cell counts versus time in days. Curve 1 is for ammonium bicarbonate treated cod; curve 2 is for sodium bicarbonate treated cod; curve 3 is for distilled water treated cod; and curve 4 is for pH-adjusted water treated cod.

FIG. 1 shows total bacterial growth. Ammonium bicarbonate was most effective in inhibiting total bacterial growth.

Total growth on cod treated with ammonium bicarbonate (curve 1) had a delayed lag phase, and final numbers were approximately 1000-fold lower than the untreated control. If $10^6$ cells/gram is taken as microbial spoilage, then the untreated cod (curve 3) and the cod treated with pH adjusted water (curve 4) spoiled after 4 days, whereas sodium bicarbonate treated cod (curve 2) reached $10^6$ cells/gram after 7 days. Ammonium bicarbonate treated cod remained microbially stable for the entire storage period.

As shown in FIG. 2, hydrogen sulfide producers were completely inhibited for the entire storage period by ammonium bicarbonate treatment (curve 1). The controls (curves 3 and 4) reached $10^6$ cells/gram within 6 days but the sodium bicarbonate-treated cod (curve 2) did not, even after 8 days.

As shown in FIG. 3, proteolytic organisms were also completely inhibited over the entire study period by the ammonium bicarbonate treatment (curve 1). The control fish reached $10^6$ cells/gram in 3 days, but the sodium bicarbonate (curve 2) and pH adjusted water (curve 4) treatments reached this level only after 7 days.

EXAMPLE 4

Mixtures of ammonium and sodium bicarbonate were also used to determine their effect on bacterial growth in fresh cod fillets. Solutions containing bicarbonate mixtures in an aggregate concentration of 8% to 12% by weight were prepared in the following ammonium bicarbonate:sodium bicarbonate weight ratios: 1:1, 1:3, 1:7 and 1:15. The controls were ammonium bicarbonate (12%) and distilled water. The cod fillets were dipped for one half hour in the solutions and then stored at 4° C. Total aerobic plate count was determined on days 0, 2, 4, 6, and 8.

Figure 4:
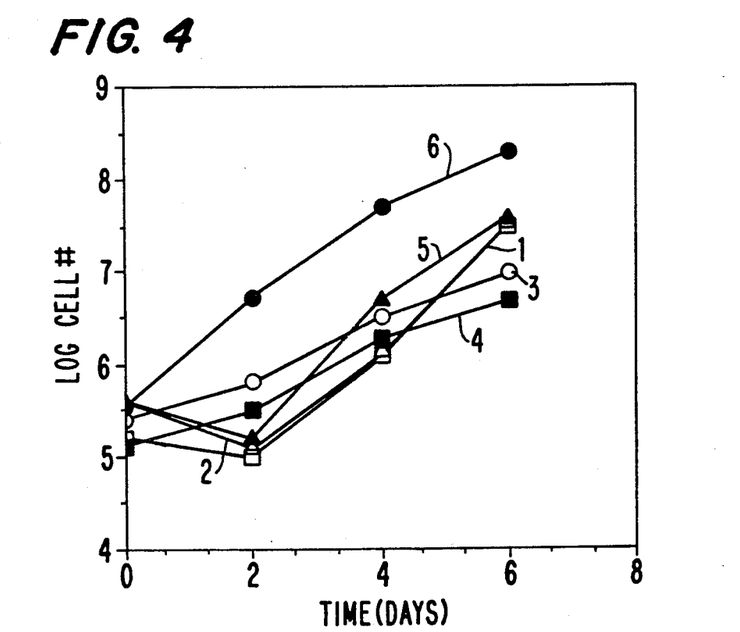
FIG. 4 is a graph showing the total aerobic bacterial growth versus time for fresh cod fillets treated with various bicarbonate solutions.

As can be seen in FIG. 4, this batch of cod had a high initial microbial count. The cod did display delayed rates of spoilage however. At day 4, the saturated solutions of ammonium bicarbonate (curve 1) and the 1:1 mixture (curve 2) were most effective. The 1:3 solution (curve 3) and the 1:7 solution (curve 4) were slightly less effective. The 1:15 solution (curve 5), while least effective, did reduce the total aerobic count compared to the control (curve 6) which reached $10^6$ cells/gram after only one day of storage. All the fish treated according to the invention took 3-4 days to reach this level.

EXAMPLE 5

The effect of ammonium bicarbonate treatments on bacterial growth in cod fillets was examined by dipping fresh locally obtained cod fillets in various solutions of ammonium bicarbonate.

Figure 5:
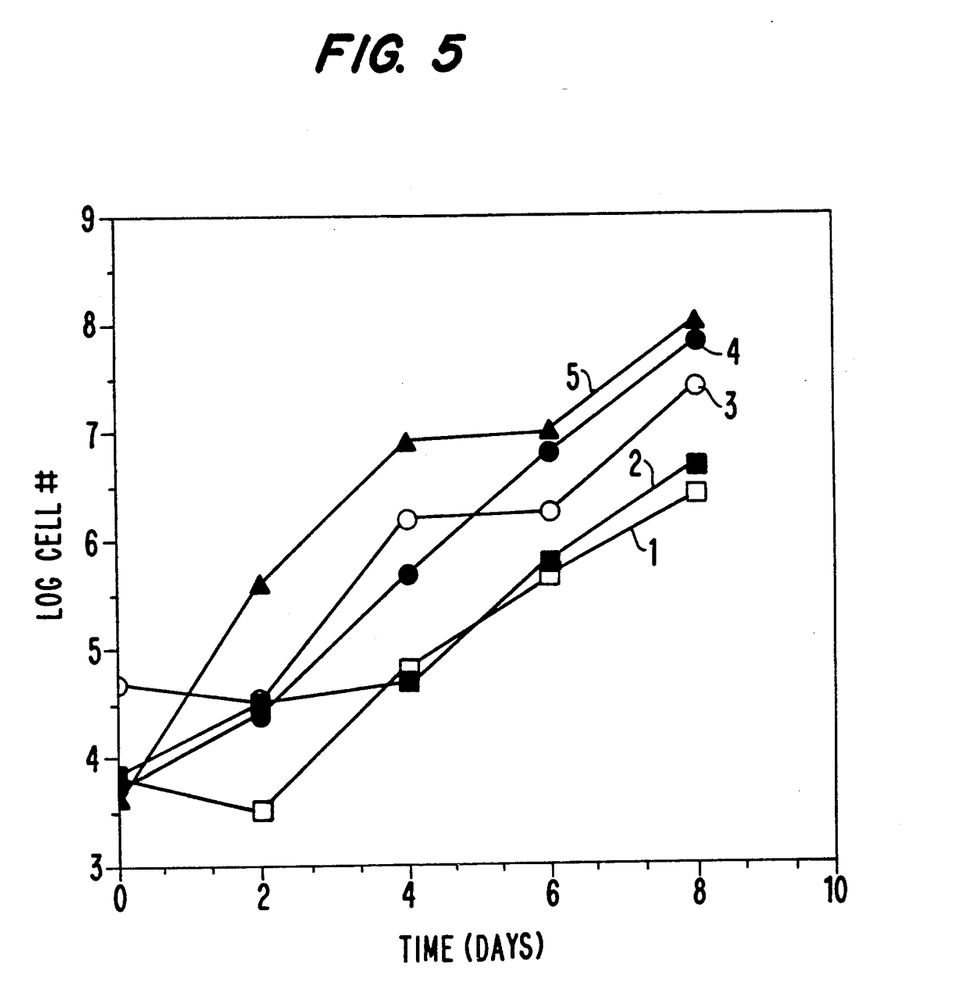
FIG. 5 is a graph showing the total aerobic bacterial growth versus time for fresh cod fillets treated with various ammonium bicarbonate solutions.

The results are given in FIG. 5 wherein curve 1 is a 12% solution of ammonium bicarbonate; curve 2 is a 6% ammonium bicarbonate solution; curve 3 is 3% ammonium bicarbonate solution; curve 4 is a 50:50 by volume mixture of saturated ammonium bicarbonate and sodium bicarbonate; and curve 5 is a distilled water control.

It is apparent that treatment by ammonium bicarbonate inhibited the growth over all concentrations over the control for from 2 to 6 days.

EXAMPLES 6-7

The seafood treated by the process of the present invention have obvious texture changes which can be quantified by determining centrifugal drip and cooked drip. Centrifugal drip is the % moisture lost from the original sample. Cooked drip values are measured by placing 50% of cubed raw fish in sealed plastic bags and immersing them in an 80° C. water bath for 30 min. The moisture lost during cooking is then weighed.

Fresh cod fillets were treated with concentrated ammonium bicarbonate, and with ammonium bicarbonate solutions mixed with various proportions of sodium bicarbonate (1:1, 1:3, 1:7, and 1:15). The control was distilled water.

Figure 6:
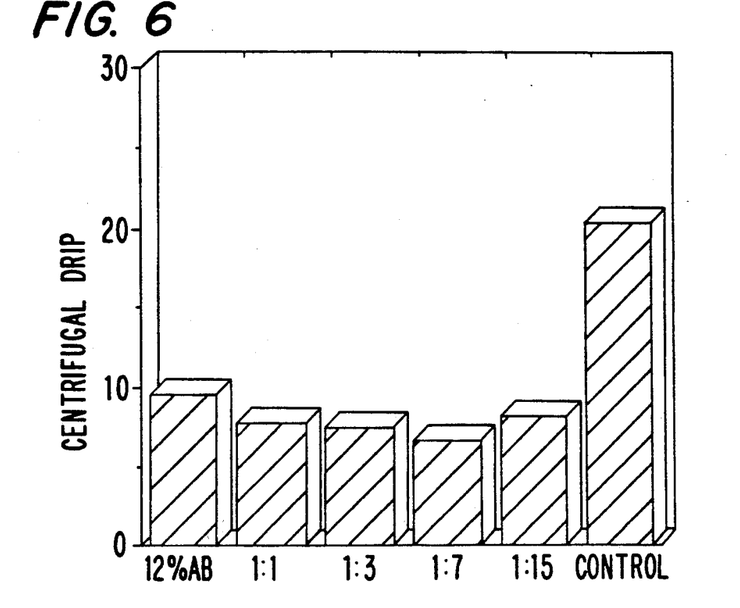
FIG. 6 is a bar graph showing the moisture loss of variously treated samples of fresh cod fish.
Figure 7:
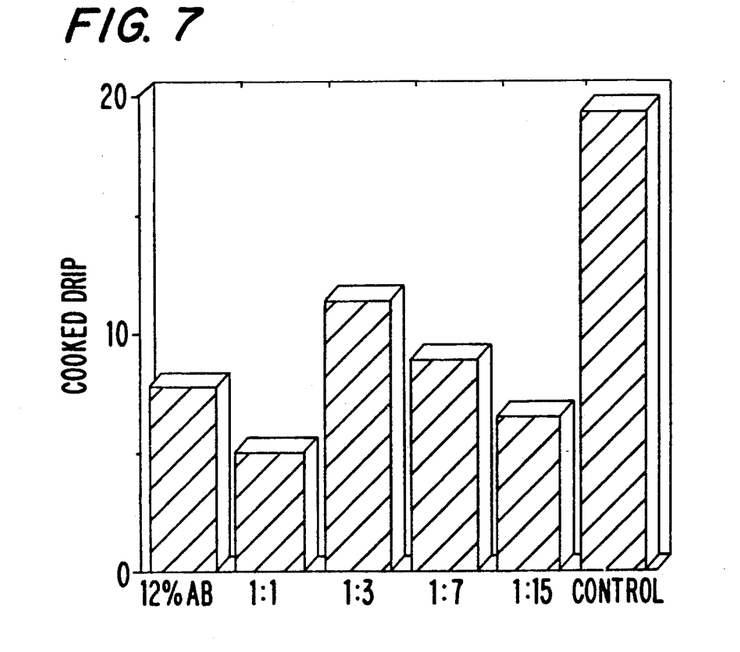
FIG. 7 is a bar graph showing the moisture loss of cooked fresh cod fillets treated with various solutions.

After 5 days of refrigerated storage, treated cod had markedly less drip loss and was flaker than the untreated control. Both centrifugal drip (FIG. 6) and cooked drip (FIG. 7) showed bicarbonate treatments reduced moisture loss by at least 50% over the control.

EXAMPLE 8

This Example measured texture using an Instron texture testing instrument equipped with a Kramer shear-compression cell. Cooked fish was drained, diced and placed in a random fashion in the Kramer cell and sheared once. The results are summarized in FIG. 8, which is a graph of the pounds of force required to shear the samples treated with various solutions of ammonium bicarbonate alone (left most graph) and mixtures of saturated solutions of ammonium bicarbonate and sodium bicarbonate, as shown. The control was distilled water.

Figure 8:
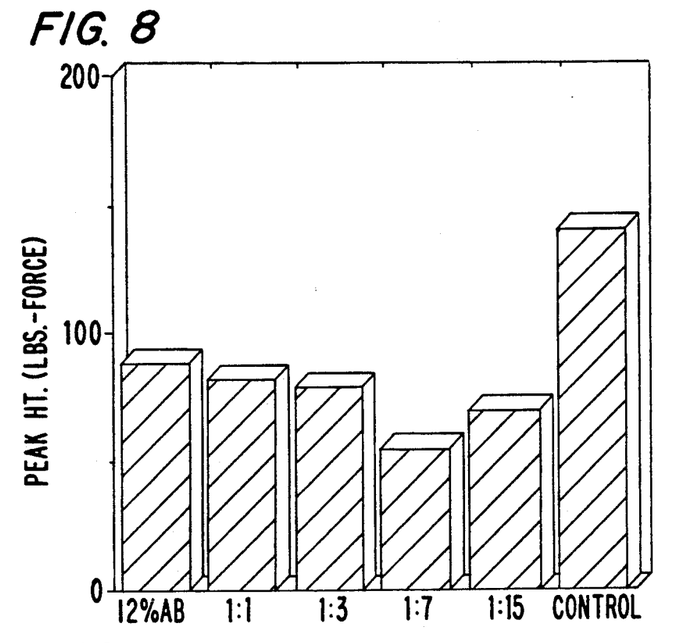
FIG. 8 is a bar graph showing measurements of peak force needed to shear fresh cod fillets treated with various solutions.

Referring to FIG. 8, it is apparent that all treated samples required less force to shear the treated samples than the control. Thus the treatment of the invention results in more tender, flakier seafood.

EXAMPLE 9-10

Measurements of bacterial growth were carried out as above using shrimp instead of cod, and using various other solutions in addition to bicarbonate-containing solutions.

Figure 9:
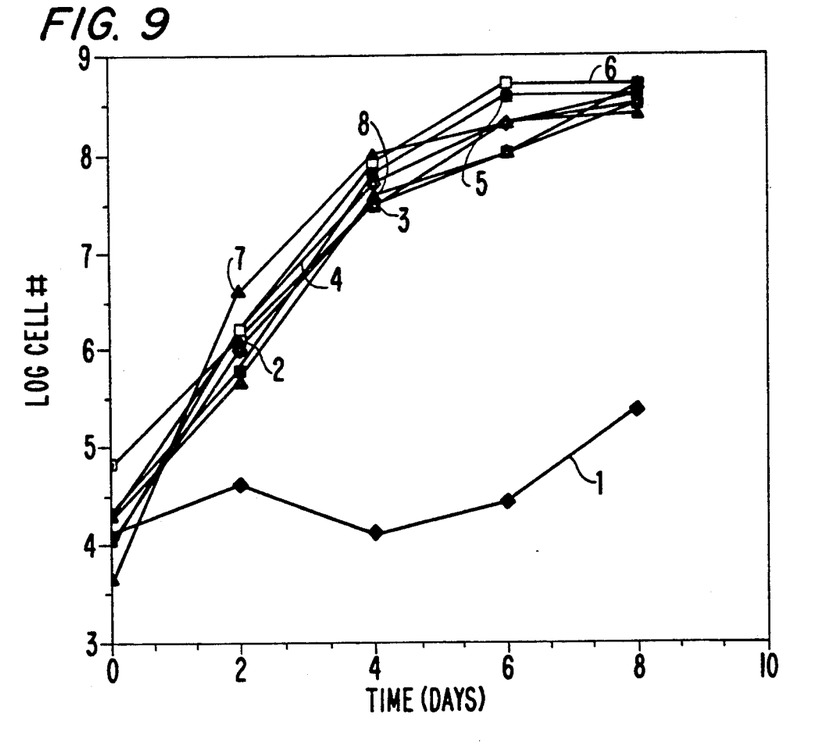
FIG. 9 is a graph showing the total aerobic bacterial growth versus time for treated and untreated fresh shrimp.

Fresh shrimp were peeled and dipped for one-half hour in various solutions, as detailed below, and stored at 4° C. and tested on days 0, 1, 2, 3, 4, 6 and 8. The results are shown in FIG. 9 wherein curve 1 shows the results for dipping in saturated ammonium bicarbonate; curve 2 is for sodium bicarbonate; curve 3 is sodium chloride (6.25%); curve 4 is ammonium sulfate (9.9%); curve 5 is ammonium hydroxide (5.25%); curve 6 is a distilled water control and curve 7 is distilled water adjusted to a pH of 7.9. Curve 8 is untreated shrimp.

It is apparent that ammonium bicarbonate inhibited total bacterial growth on shrimp over the 8 day storage time of this test. However, the shrimp had a strong odor of ammonia over the life of the test, and after cooking. Sodium bicarbonate solution kept the shrimp smelling fresh up to day 6, but did not reduce the bacterial count greatly. None of the other treatments inhibited total growth either.

Figure 10:
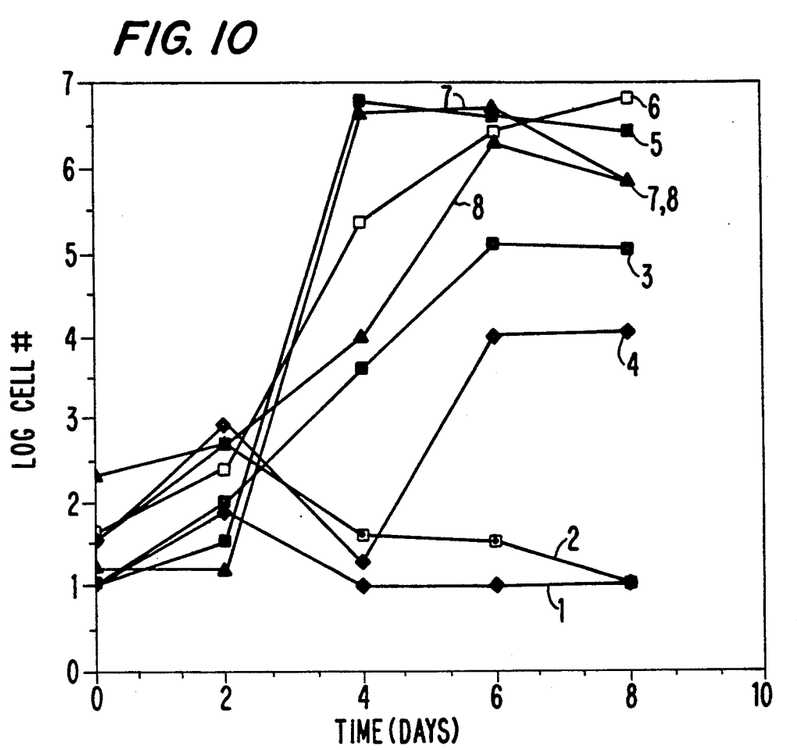
FIG. 10 is a graph showing the growth of hydrogen sulfide-producing bacteria on variously treated fresh shrimp.

FIG. 10 shows the cell counts for H$_2$S producing bacteria, wherein the curve numbers correspond to the solutions enumerated for FIG. 9. The growth of these organisms was inhibited both by ammonium bicarbonate (curve 1) and sodium bicarbonate (curve 2) but not by the controls (curve 3—distilled water, or curve 4, pH adjusted distilled water).

EXAMPLE 11

The treatment set forth in Example 1 was repeated using fresh mackeral fillets instead of cod fish.

Figure 11:
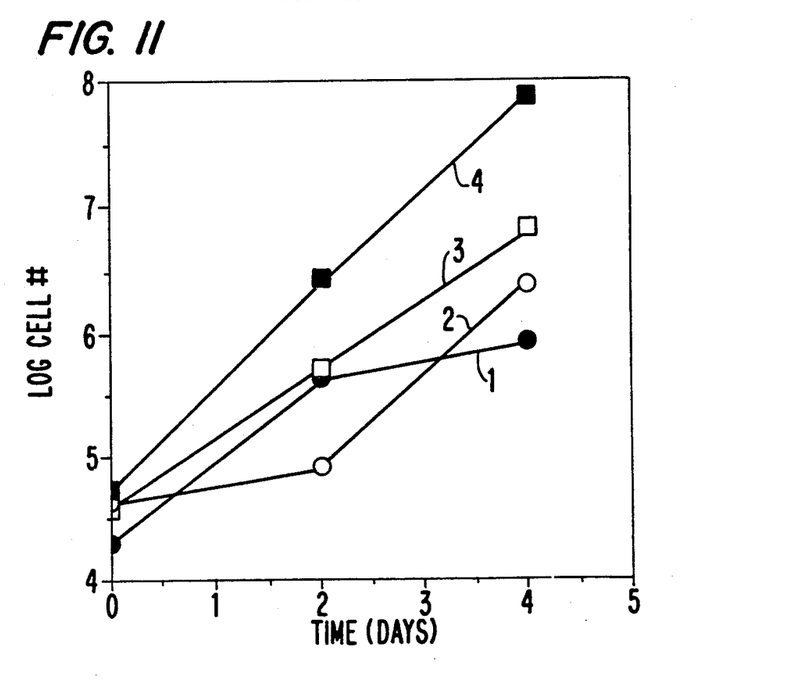
FIG. 11 is a graph showing the total aerobic bacterial growth versus time for treated and untreated fresh mackeral fillets.

FIG. 11 illustrates the reduction in total aerobic growth with time. In this case sodium bicarbonate (curve 2) was slightly more effective than ammonium bicarbonate treatment, (curve 1) or a 1:15 mixture of ammonium and sodium bicarbonates (curve 3); however, all treatments were remarkably more effective than the distilled water control (curve 4).

EXAMPLE 12

Figure 12:
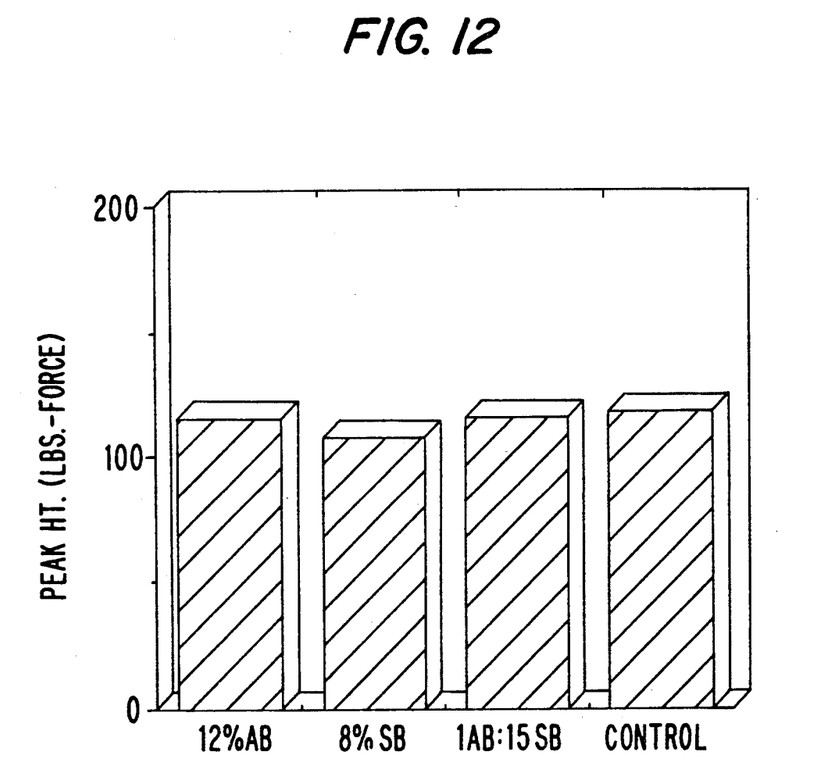
FIG. 12 is a bar graph showing the measurements of peak force needs to shear fresh mackeral fillets treated with various bicarbonate solutions.

The procedure of Example 8 was followed except substituting mackeral fillets for the cod fish. The results are shown in FIG. 12 for saturated ammonium bicarbonate (left-most graph), saturated sodium bicarbonate, a mixture of 1:15 saturated ammonium and sodium bicarbonates, and distilled water, each to the right of the other, respectively.

EXAMPLE 13

This example demonstrates that treatment with a bicarbonate solution increases the pH of seafood.

Ten grams of fish were blended and 10 ml of distilled water added. The pH of this mixture was measured. The solution was then diluted further, and the pH measured after each dilution. The pH of the solutions were plotted against the volume of the solution (pH dilution curve). The pH of the original volume of fish was then measured by extrapolating the curve to zero sample direction.

As shown in Table I, treatment with bicarbonate solutions increased the pH of cod fish fillets by at least one pH unit.

TABLE 1

| Treatment | pH |
| --- | --- |
| Untreated | 6.97 |
| Saturated ammonium bicarbonate | 8.56 |
| Saturated sodium bicarbonate | 8.55 |
| Mixture* | 8.25 |
| Distilled water | 7.09 |

*1:15 ammonium bicarbonate and sodium bicarbonate

We claim:

1. A process for inhibiting the microbial spoilage of fresh seafood which comprises immersing the seafood in an aqueous solution containing an alkali metal bicarbonate in a concentration of from about 3 percent by weight up to saturation for a period of up to about eight hours to inhibit the growth of bacteria wherein said alkali metal bicarbonate is selected from the group consisting of ammonium bicarbonate and mixture of ammonium bicarbonate and sodium bicarbonate in weight ratios of from about 1:1 to about 1:15.

2. The process according to claim 1 wherein the alkali metal bicarbonate is ammonium bicarbonate.

3. The process according to claim 1 wherein the alkali metal bicarbonate is a mixture of ammonium bicarbonate and sodium bicarbonate in a weight ratio of from about 1:1 to about 1:15, and wherein said solution of said mixture additionally improves the texture and moisture retention of the seafood.

4. The process of claim 3 wherein the ratio of ammonium bicarbonate to sodium bicarbonate is about 1:1.

5. The process according to claim 1 wherein the alkali metal bicarbonate solution is a saturated solution.

6. A process for inhibiting the microbial spoilage of fresh seafood which comprises immersing the seafood in an aqueous solution containing an alkali metal bicarbonate in a concentration of from about 3 percent by weight up to saturation for a time sufficient to increase the pH of the flesh of said seafood by from about 1 to about 1.5 pH units, wherein said alkali metal bicarbonate is selected from the group consisting of ammonium bicarbonate and mixtures of ammonium bicarbonate and sodium bicarbonate in weight ratios of from about 1:1 to about 1:15.

7. The process of claim 6 wherein the alkali metal bicarbonate is ammonium bicarbonate.

8. The process according to claim 6 wherein the alkali metal bicarbonate is a mixture of ammonium bicarbonate and sodium bicarbonate in a weight ratio of about 1:1 to about 1:15, and wherein said solution of said mixture additionally improves the texture and moisture retention of the seafood.

9. The process of claim 8 wherein the ratio of ammonium bicarbonate to sodium bicarbonate is about 1:1.

10. The process according to claim 6 wherein the alkali metal bicarbonate solution is a saturated solution.

11. A process for inhibiting the microbial spoilage of fresh seafood which is to be cooked prior to consumption, canning, freezing or processing said seafood which comprises immersing the seafood in an aqueous solution containing an alkali metal bicarbonate in a concentration of from about 3 percent by weight up to saturation for a period of up to about eight hours, wherein said alkali metal bicarbonate is selected from the group consisting of ammonium bicarbonate and mixtures of ammonium bicarbonate and sodium bicarbonate in weight ratios of from about 1:1 to about 1:15.

12. The process of claim 11 wherein the alkali metal bicarbonate is ammonium bicarbonate.

13. The process according to claim 11 wherein the alkali metal bicarbonate is a mixture of ammonium bicarbonate and sodium bicarbonate in a weight ratio of about 1:1 to about 1:15, and wherein said solution of said mixture additionally improves the texture and moisture retention of the seafood.

14. The process of claim 13 wherein the ratio of ammonium bicarbonate to sodium bicarbonate is about 1:1.

15. The process of claim 11 wherein the alkali metal bicarbonate solution is a saturated solution.

* * * * *